United States Patent [19]

Colburn

[11] 4,187,035
[45] Feb. 5, 1980

[54] KEEPER PIN SYSTEM FOR SHOVEL TEETH

[76] Inventor: Edward N. Colburn, 5312 Vincent Ave. South, Minneapolis, Minn. 55410

[21] Appl. No.: 12,011

[22] Filed: Feb. 14, 1979

[51] Int. Cl.² .............................. B25G 3/00; F16B 3/00
[52] U.S. Cl. ........................................ 403/318; 403/2; 403/316; 403/374; 403/409
[58] Field of Search ................... 403/316, 2, 318, 355, 403/361, 374, 409

[56] References Cited
U.S. PATENT DOCUMENTS

| 2,312,802 | 3/1943 | Crawford | 403/318 X |
| 2,651,390 | 9/1953 | Polanin | 403/409 X |
| 2,958,562 | 11/1960 | Jones | 403/409 |

FOREIGN PATENT DOCUMENTS 150583 9/1920 United Kingdom ................. 403/355

*Primary Examiner*—Wayne L. Shedd
*Attorney, Agent, or Firm*—Barry L. Clark

[57] ABSTRACT

Improved locking or keeper pin system for replaceably retaining digger teeth on large power excavator shovels includes a pair of wedge-shaped keeper pin members which cooperate to produce a seizing taper lock. The keeper pin members are easily installed and released from the top of the tooth. One of the keeper pin members includes a retaining spring which snaps into a recess in the tooth and base member to provide positive locking. The other keeper pin member has a hardened retaining hook which engages a lip on the base member. An access port in the top of the tooth permits a chisel to be brought into contact with the top of the retaining hook. The retaining hook is easily severed, using the lip as an anvil, to release the lock when the tooth is to be replaced.

9 Claims, 5 Drawing Figures

KEEPER PIN SYSTEM FOR SHOVEL TEETH

BACKGROUND OF THE INVENTION

The invention relates to a retaining means for retaining an excavating tooth on a support while permitting replacement of the tooth when it is worn.

Large power shovels of the type commonly used to scoop iron ore or taconite from the ground following the blasting operation have a row of large teeth along the forward edge, or lip, of the floor of the shovel. These teeth are subject to extreme wear and are replaceable. A large shovel may have six such teeth, each tooth being shaped somewhat like a chisel point, 18 inches in length, 8×8 inches at the base, and weighing perhaps 120 lbs. The teeth are cast from one of several types of high strength, abrasion-resistant steel. Such shovels are used in all types of mining.

The shovel teeth are removably fastened to the lip of the shovel by means of various keeper pin systems. Each tooth incorporates a cavity in its base which mates with a projection on the lip of the shovel. In most cases, this projection is part of an intermediate piece called the "base" or "adapter", which in turn is removably fastened to the lip of the shovel.

When the tooth is placed on the base, the keeper pin is driven down through holes which are aligned in the tooth and base. The keeper pin thus is used to lock the tooth to the base. When the tooth is worn out, the keeper pin is removed, and a new tooth and keeper pin are assembled on the base.

There are a large number of different keeper pin systems in use in industry, and/or shown in prior art patents. For example: Philbrick U.S. Pat. No. 2,242,793; Larsen U.S. Pat. No. 2,709,941; Petersen U.S. Pat. No. 2,968,880; Stephenson U.S. Pat. No. 2,994,141; Eyolfson U.S. Pat. No. 3,121,289; Hofstetter U.S. Pat. No. 3,256,622; Phillips U.S. Pat. No. 3,334,431; Judkins et al U.S. Pat. No. 3,368,293; Duplessis U.S. Pat. No. 3,388,488; Hensley U.S. Pat. No. 3,444,633; Hensley et al U.S. Pat. No. 3,520,224; VonMehren U.S. Pat. No. 3,832,077; Hemphill U.S. Pat. No. 4,037,337 and Hahn et al U.S. Pat. No. 4,061,432. Unfortunately, none of the known keeper pin systems meet all the criteria of an "ideal" system which should: be simple and foolproof to install; rigidly secure the tooth to the base; not release in severe use; be simply released by one man; be installed and released by operating on the top of the tooth only; not be affected by weather extremes; and be inexpensive to manufacture.

SUMMARY

It is the object of the present invention to provide an improved keeper pin locking system which provides all of the aforementioned advantages of an "ideal" keeper pin system. The system utilizes a pair of wedge-shaped keeper pin members. Each keeper pin can be simply installed and removed from the top of the tooth in a very simple manner. The first wedge-shaped keeper pin is installed through a pair of aligned vertical transverse apertures formed in the tooth and its support so that its thicker end is down. A frangible hook on this first keeper pin is adapted to overlie a lip formed on the top surface of the support immediately adjacent the vertical side wall of the aperture in the support. The hook and the lip cooperate to limit the downward movement of the keeper pin. The second wedge-shaped keeper pin is then driven down into the opening in overlying relation to the first keeper pin and contacts the first keeper pin in the plane of a common tapered contact surface. The first keeper pin is thus forced tightly against the vertical forward wall of the aperture in the support while the second keeper pin is forced tightly against the rearward wall of the aperture in the tooth. The second keeper pin incorporates a spring retaining finger which snaps into a recess formed in the back wall of the support aperture when the second keeper pin is driven to its locked position. The retaining finger engages the generally horizontal internal tooth wall at the top of the recess to prevent upward movement of the second keeper pin.

Since the frangible hook and the retaining finger positively resist any force that might be applied to the small end of either of the wedge-like keeper pins to release the lock, it is obvious that the system will maintain the tooth firmly engaged with its support until removal for replacement is necessary. Since the hook on the first keeper pin is fragible, such as being made of very hard steel, it can be severed by a hard blow of a hammer on a chisel. For this purpose, an access opening is provided in the tooth's top surface. Once the hook is severed, the first keeper pin can be hammered downwardly to release the seized taper locking action and permit the second keeper pin to be removed and the tooth separated from its support. Since the ends of the keeper pins are generally worn along with the tooth they are usually replaced. However, where they can be reused, a mere replacement of the fragible hook will renew the locking system.

DETAILED DESCRIPTION OF THE INVENTION

Figure 1:
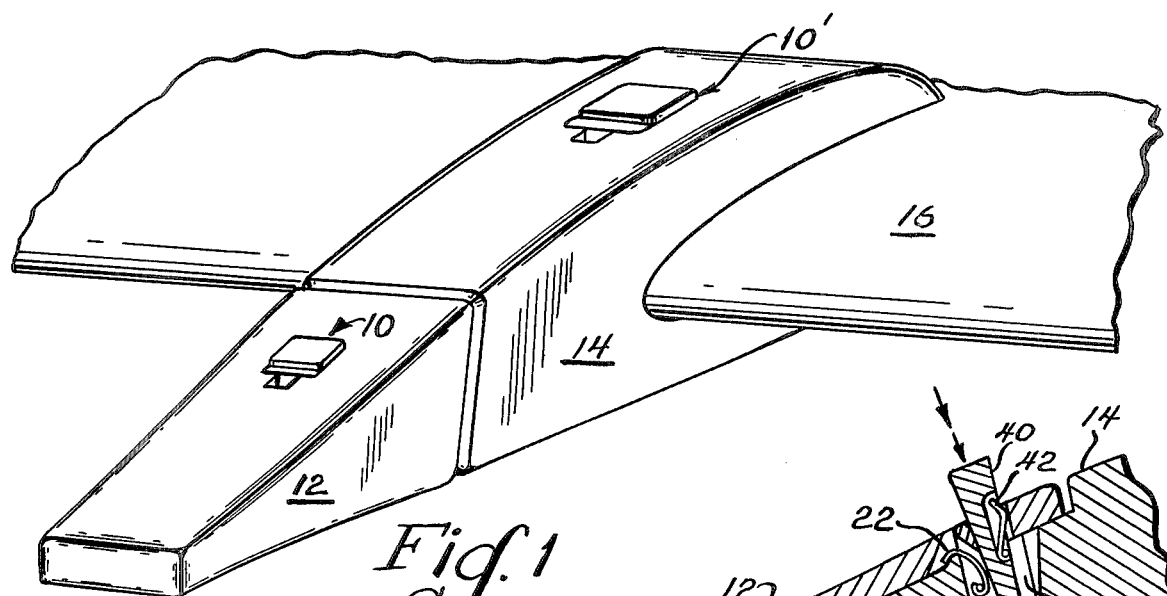
FIG. 1 is a perspective view illustrating the operative relationship between a digger tooth, an adapter, and a bucket lip.

Referring to FIG. 1, my improved keeper pin locking assembly and a slight modification thereof are indicated generally at 10 and 10'. The assembly 10 is provided for locking a replaceable excavator tooth 12 to an adapter support member 14 while the adapter member 14 is similarly locked to the bucket lip 16 of the excavator (not shown) by the assembly 10'.

Figure 2:
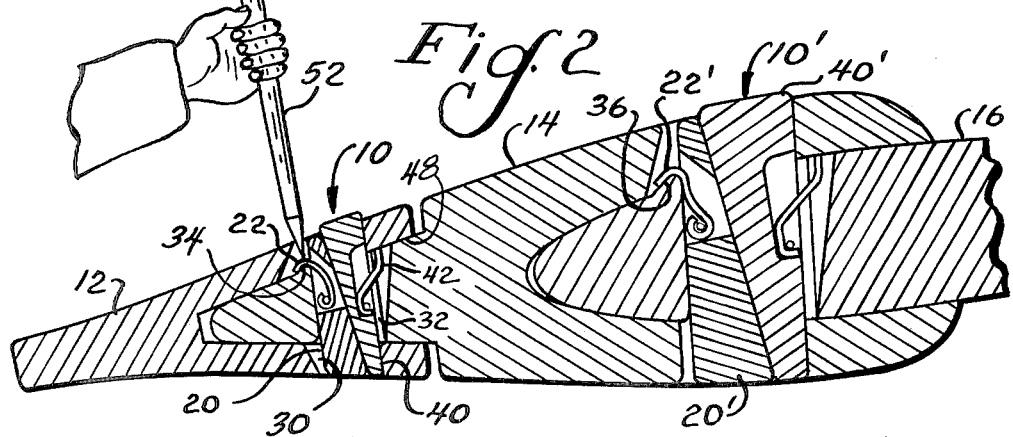
FIG. 2 is a side sectional view taken along a vertical center plane through the tooth, adapter and bucket lip with the improved keeper pin locking system engaged.
Figure 4:
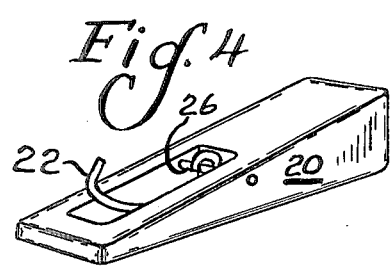
FIG. 4 is a perspective view of the keeper pin which incorporates a frangible retaining hook.

As seen in FIG. 2, the keeper assembly 10 includes a first wedge-shaped keeper pin 20 having a C-shaped retaining hook 22 attached to it about a pin 26. After the hollow rear portion of the tooth 12 is slid into mating engagement with the pointed forward portion of the adapter 14, the generally vertical aperture 30 which extends through the top and bottom walls of the tooth 12 will be generally aligned with the generally vertical aperture 32 which is formed in the adapter 14.

Figure 3:
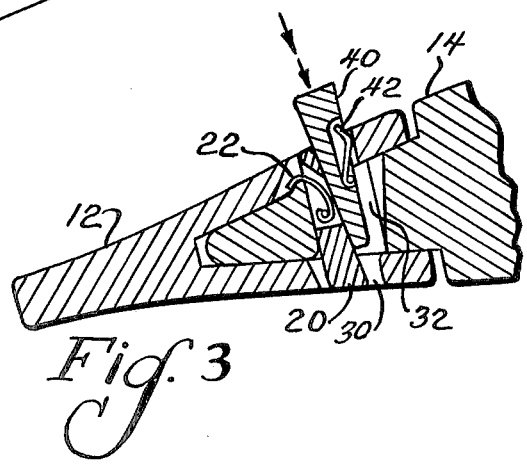
FIG. 3 is a fragmentary section view illustrating the final act of assembly of the wedge-shaped keeper pins.

An adapter lip 34 is integrally formed on the forward tip of the adapter 14 just forward of the upper edge of the forward wall of the aperture 32. The adapter lip 34 is engaged by the hook 22 and prevents keeper pin 20 from moving any lower than shown in FIG. 3. The lip 36 is identical in function to the lip 34 but is formed on the tip portion of the bucket lip 16 where it is engaged by hook 22' on keeper pin 20'.

The hook 22' is a slight modification of the hook 22 in that it includes a reversely bent central portion which permits a slight straightening of the hook to take place in the event the upper end of the keeper pin 20' is subjected to a large downward load during use.

Figure 5:
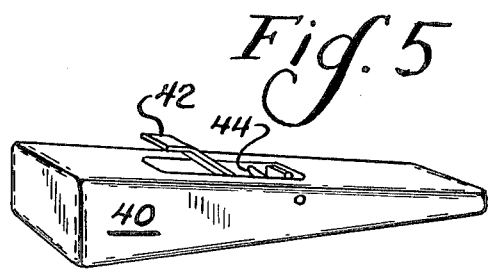
FIG. 5 is a perspective view of the keeper pin which incorporates a resiliently biased retaining finger.

A second wedge-shaped keeper pin 40 carries a stiff retaining spring 42 which is attached to a retaining pin 44 and normally biased outwardly as shown in FIG. 5. When the second keeper pin 40 is driven downwardly, as shown by the arrow in FIG. 3, the spring 42 is compressed as it passes the upper rear surface of the tooth aperture 30. Continued driving movement of the pin 40 along its common contact surface with pin 20 causes the outer parallel surfaces of the keeper pins to move away from each other as they simultaneously engage the front surface of aperture 32 and the rear surface of aperture 30 to cause the tooth 12 to be forced into ever tighter engagement with the adapter 14. As the pin 40 reaches its FIG. 2 position, the spring retaining finger 42 will snap into a recess formed in the back wall of aperture 32. In this latter position, any upward force applied to the lower end of pin 40 will be resisted by the tooth surface 48 which engages the stiff retaining finger 42.

When a member 12 retained by the locking pin system 10 is worn and needs replacement, the system can be easily released by one person by placing a cold chisel 52 in contact with the frangible hook 22 as shown in FIG. 2 and driving it with a hammer against the anvil surface formed by lip 34. Access for the chisel 52 to the hook 22 is provided by a recess formed in the upper front surface of aperture 30. The retaining hook 22 is preferably formed from heat treated alloy spring steel and is rigid enough to hold pin 20 in position as pin 40 is driven into place but suitably hard that it can be severed by a chisel blow. The retaining spring 42 is also made of a heat-treated alloy spring steel such as 1072 having a hardness of $R_c=47$. The contact surfaces of pins 20 and 40 should have a taper angle sufficient to provide a seizing action. Angles in the range of about 3°–9° are typical.

It can be seen that, once properly installed, the only way to remove the keeper pins 20, 40 is to sever the retaining hook 22 of pin 20. Even if, for some reason, such as a sharply-pointed rock fragment being driven into the bottom of the pins, the pins become loose in the pocket, i.e. the seizing wedge breaks loose, the pins cannot drop out and the tooth cannot fall off the adapter. Thus the system is fail-safe. This is very important, for example, in taconite mining. Bucket teeth or keeper pins which drop off and find their way into the primary crushers and on to the grinding circuits cause severe problems due to their high hardness and toughness.

I claim as my invention:

1. A keeper pin locking system for positively retaining a replaceable excavator tooth member having a tapered female internal contact surface in firm locking engagement with a complementary tapered male external contact surface on a tooth supporting base member comprising a pair of first and second wedge members which are adapted, respectively, to engage each other and portions of one of the opposite sides of vertically aligned transverse apertures formed through said tooth member and base member in the region of said complementary tapered internal and external contact surfaces; retaining means on each of said pair of wedge members which extend beyond the wedge surfaces in the longitudinal direction of the tooth member; said retaining means being adapted to engage retaining portions on said tooth or on said tooth supporting base member; said retaining means being engageable with said retaining portions when said wedge members are in contacting overlying relationship with each other to prevent the removal of said wedge members from said transverse apertures.

2. The keeper pin locking system of claim 1 wherein at least one of said retaining means is frangible and must be severed to release its engagement with its associated retaining portion.

3. The keeper pin locking system of claim 2 wherein said tooth member includes an opening adjacent one of said pair of wedge members for permitting a severing tool to be brought into contact with said at least one retaining means.

4. The keeper pin locking system of claim 3 wherein said at least one retaining means comprises a frangible wire member which overlies a portion of said base member which is contiguous with the transverse aperture through said base member and which underlies said opening in said tooth member.

5. The keeper pin locking system of claim 1 wherein one of said retaining means comprises a resilient spring member anchored to one of said wedge members and having a free end which engages the internal contact surface of said tooth member end which is located adjacent the aperture in said base member.

6. The keeper pin locking system of claim 2 wherein said at least one retaining means is in the shape of a hook pivoted at one end to one of said wedge members.

7. The keeper pin locking system of claim 6 wherein said hook shaped retaining means is generally C-shaped.

8. The keeper pin locking system of claim 6 wherein said hook shaped retaining means includes a reverse bend portion between its ends to permit a slight deformation of the retaining means when severe shock loads are applied to its associated wedge member.

9. The keeper pin locking system of claim 4 wherein the other of said pair of wedge members has a recess in the outer side thereof in which a retaining member is mounted, the retaining member being mounted at the end of said recess which is closest to the converging end of said other of said pair of wedge members, said retaining member having a free end which is adapted to be totally contained within said recess when said other of said pair of wedge members is driven toward wedge locking engagement with said one of said pair of wedge members, said free end of said retaining member being further adapted to spring out of said opening to engage a portion of the internal contact surface of said tooth as soon as said one of said pair of wedge members is driven into locking engagement with the other.

* * * * *